United States Patent [19]

Johns

[11] Patent Number: 4,811,253
[45] Date of Patent: Mar. 7, 1989

[54] METHOD AND APPARATUS FOR THE MEASUREMENT OF AIRFOILS

[75] Inventor: Antony Johns, Guiseley, England
[73] Assignee: AE PLC, Rugby, England
[21] Appl. No.: 841,511
[22] Filed: Mar. 19, 1986
[30] Foreign Application Priority Data

Mar. 30, 1985 [GB] United Kingdom ................. 8508391

[51] Int. Cl.⁴ .......................... G01B 5/20; G06F 15/46
[52] U.S. Cl. .................................. 364/560; 364/559; 364/474.29; 364/474.37; 33/546
[58] Field of Search ............... 364/560, 474, 475, 550, 364/559, 556, 505–507; 33/545, 546, 505, 555, 556, 503; 318/601, 574, 567

[56] References Cited

U.S. PATENT DOCUMENTS

| | | | |
|---|---|---|---|
| 3,164,909 | 1/1965 | Rosenberg | 318/567 |
| 3,627,997 | 12/1971 | Samuels et al. | 364/560 |
| 3,751,651 | 8/1973 | Pomella et al. | 318/601 |
| 3,832,784 | 9/1974 | Samuels et al. | 33/555 |
| 4,053,989 | 10/1977 | Yamaji et al. | 33/505 |
| 4,181,958 | 1/1980 | Juengel et al. | 33/505 |
| 4,365,301 | 12/1982 | Arnold et al. | 364/560 |
| 4,384,407 | 5/1983 | Miyamoto | 33/503 |
| 4,428,055 | 1/1984 | Kelly et al. | 364/560 |
| 4,470,122 | 9/1984 | Sarr | 364/551 |
| 4,470,709 | 9/1984 | Koehler et al. | 364/560 |
| 4,484,293 | 11/1984 | Minucciani et al. | 364/560 |
| 4,534,007 | 8/1985 | Rhyner | 364/560 |
| 4,550,418 | 11/1985 | Deis | 33/503 |
| 4,612,622 | 9/1986 | May et al. | 364/560 |
| 4,622,756 | 11/1986 | Marsden | 33/556 |
| 4,629,378 | 12/1986 | Parsons | 33/505 |
| 4,719,578 | 1/1988 | Okitoma et al. | 364/474 |
| 4,755,952 | 7/1988 | Johns | 364/506 |

FOREIGN PATENT DOCUMENTS 2167862 6/1986 United Kingdom ................. 33/545

*Primary Examiner*—Parshotam S. Lall
*Assistant Examiner*—S. A. Melnick
*Attorney, Agent, or Firm*—William R. Hinds

[57] ABSTRACT

A method and apparatus are described for the automatic gauging of engineering components. The apparatus includes a clamp for holding a component to be gauged, probes for scanning a surface of the component, drives to provide relative motion between the component and the probes in three mutually perpendicular axes, measuring transducers associated with the drives and the probes to generate signals to measure the degree of movement between the component and the probes, computer memory for storing data relating to a reference profile having dimensions which it is desired to achieve, computer apparatus for comparing signals generated by the measuring transducers with the corresponding signals in the memory, computer apparatus for calculating any error between the stored data and signals generated by the measuring transducers to stack the component to maximize desired coincidence between the dimensions of the reference profile and the actual component. The method and apparatus are described with reference to the gauging of components having aerofoils.

5 Claims, 6 Drawing Sheets

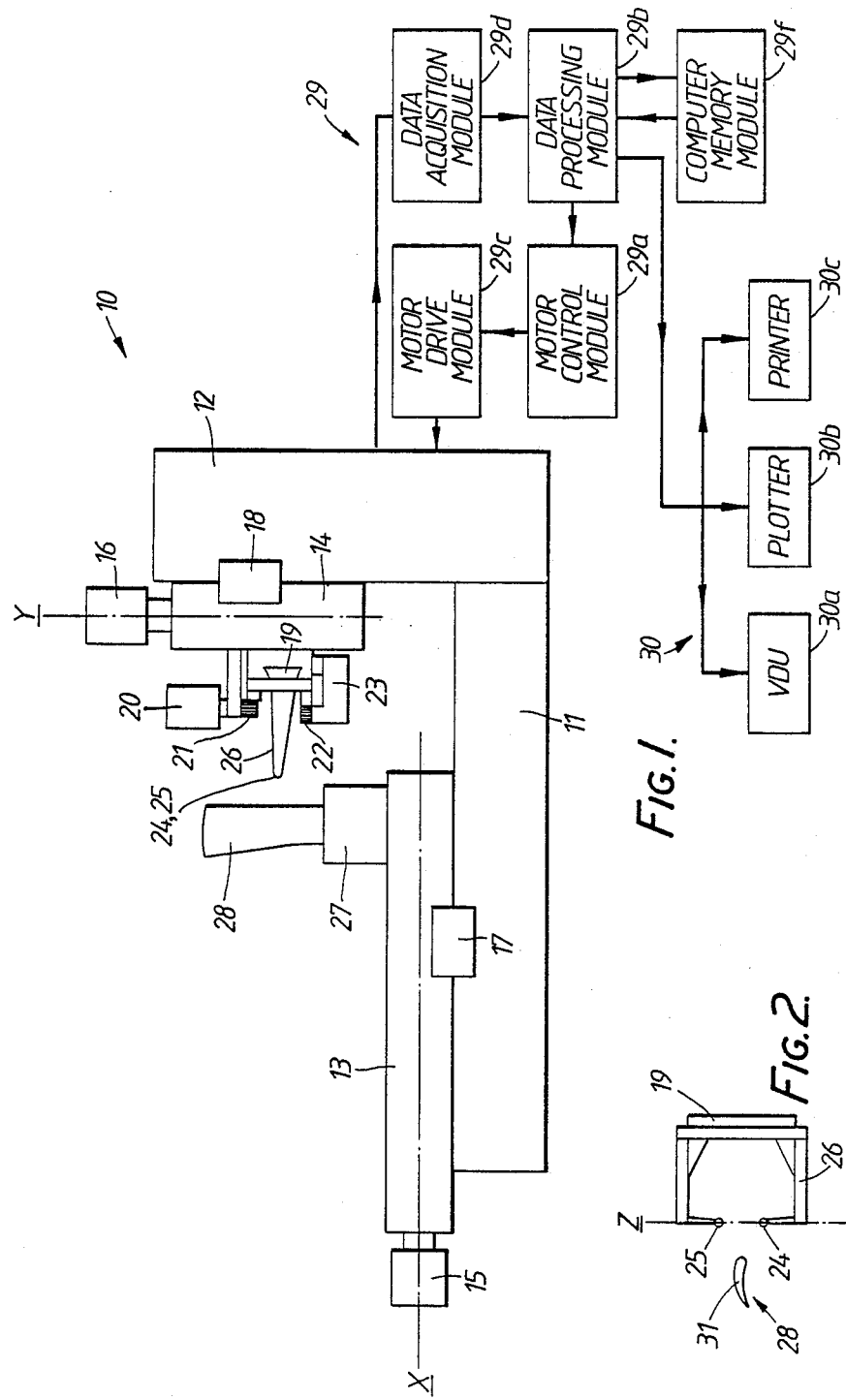

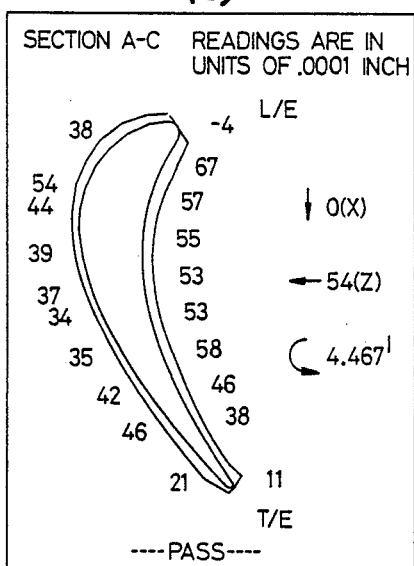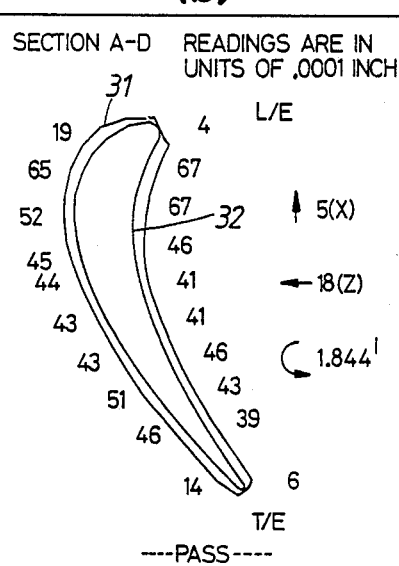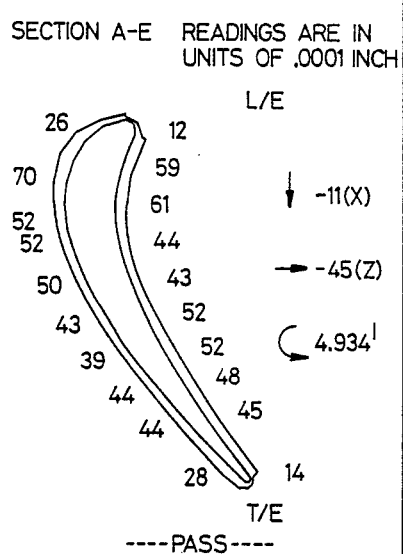
FIG. 4.

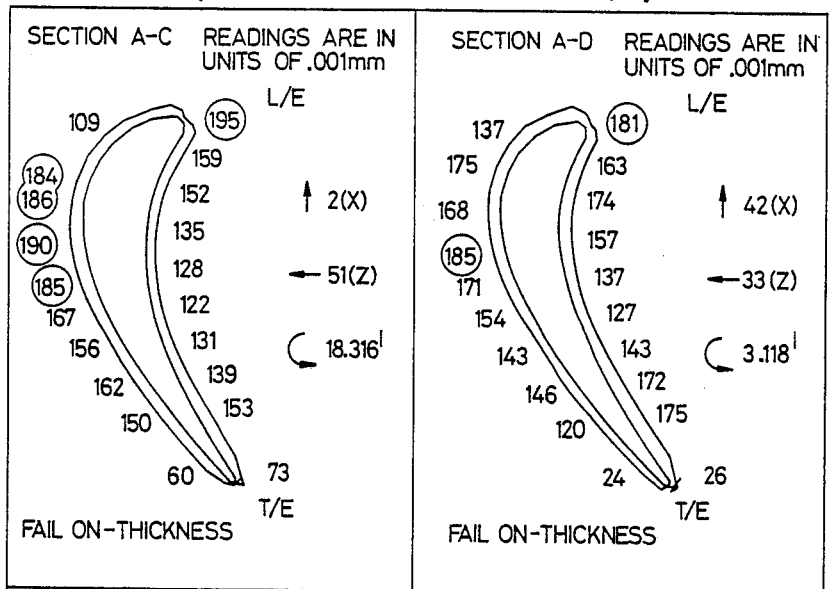
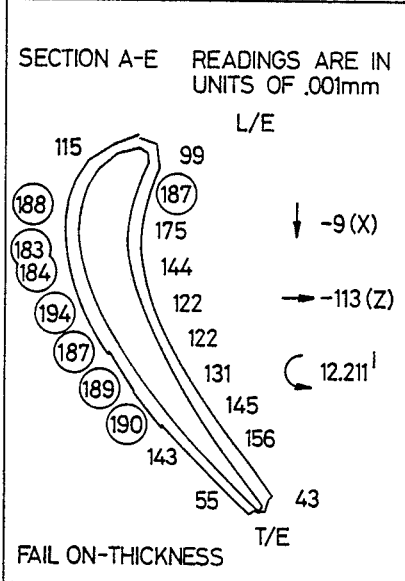
FIG. 6.

METHOD AND APPARATUS FOR THE MEASUREMENT OF AIRFOILS

The present invention relates to the gauging and machining of engineering components having complex curved shapes and particularly to the gauging and machining of components having aerofoil sections such as, for example, blades and nozzle guide vanes for gas and steam turbine engines and compressors.

When a component having an aerofoil section is produced by machining, forging or casting techniques, it is usually necessary to perform a measuring operation on the component to ensure that it lies within the allowable tolerances pertaining to that particular component. The aerofoil itself often has to satisfy tolerances not only on dimensions or thickness relating to a nominal aerofoil profile which it is desired to achieve at any given section, but also on the actual shape of the section where local areas may have to be constrained within a narrower shape tolerance band. Effectively the surface profile of a chordal section of the aerofoil must lie as a whole within a thickness tolerance band whilst each surface of the profile must lie within a narrower shape tolerance band. The shape tolerance band, however, may be at any position within the thickness tolerance band.

Presently, methods of carrying out these aerofoil measurements largely depend upon how many of the particular components have to be checked. Where the component in question is a long-run item of which many repeat batches are likely to be made with total numbers running into thousands, the preferred method is a device known as a multi-point probe. Such devices have, as their name suggests, multiple probes which contact the aerofoil at many points around several sections simultaneously and compare those sections with standard master aerofoils on which the device has been calibrated. The information generated is usually displayed or recorded in digital form on modern versions of the machine and from the information appropriate rectification by machining, etc., of the component may be carried out if necessary. Multi-point probes are very expensive and each probe is limited to gauging a single design of component.

Multi-point probes are best suited to components having a multiplicity of planar (i.e. non-curved) features and they are used on curved surfaces usually only in those instances where other checks in the manufacturing process, for example, have given confidence in the capability to hold localised shape variations in control. Multi-point probes only check the dimension at the actual point contact by the probe itself; it cannot guarantee that the slope or dimension between the contact points is within tolerance, hence the need for confidence in the manufacturing process. The production of multi-point gauges having a sufficiently high resolution to check on shape would require extremely expensive tooling. It is not certain, however, that such gauges would be able to achieve a sufficiently close spacing of the probe array.

At the other end of the scale where only a relatively small number of components are envisaged, the methods of aerofoil gauging tend to be more rudimentary. Even rudimentary methods, however, are frequently used in volume production. Mechanical comparator gauges are often used where a blank corresponding to the desired aerofoil shape is clamped in the device on one side and the component to be checked on the other side. A jockey wheel follows the blank at a chosen section and the probe of a dial gauge follows a corresponding section of the component. The gauge operator observes the deviation of the component from the desired section and marks up the aerofoil with, for example, an appropriate colour code for subsequent machining. Most machining is carried out by abrasive belt grinding. Once the operator has taken action to remove excess metal at a particular section, the component has to be replaced in the gauge to check whether the action has been adequate. Even with an expensive multi-point probe it is still necessary for the blade to be manually rectified and subsequently re-checked. Thus, existing processes for the gauging and machining of aerofoil components are extremely labour-intensive and susceptible to mistakes on the part of the operator.

In between the two extremes of mechanical gauging there are devices known as optical measuring machines or projectors typified by the OMT type of machine. In this method, the component is clamped in a fixture and the desired aerofoil section is followed by a roller or stylus which is linked to a graticule having concentric circles representing various tolerance bands. A magnified image (often $\times 10$) of the graticule is displayed on a screen in front of the operator. A transparent film on which is drawn an acurate profile of the desired aerofoil, scaled up by a factor equal to the magnification being used, is placed on the operator's screen so that the image of the concentric circles is superimposed upon the profile. The operator follows the actual aerofoil section on the component with the roller or stylus and simultaneously views the screen to observe how the graticule image which is following the component also follows the profile of the desired aerofoil on the screen. Depending on which of the tolerance bands in the graticule image coincides with the desired aerofoil profile image will determine whether the blade is in or out of tolerance. The aerofoil may have either excess metal at a particular position or be undersize corresponding to a metal-on or a metal-off condition, respectively.

Clearly, if a component aerofoil is gauged in a fixed orientation and position with reference to a desired aerofoil also in a fixed orientation and position and a metal-off condition pertains and the aerofoil is outside tolerance in that condition, then there is little that can be done in most instances to replace missing metal and the component may, therefore, be scrap. The actual aerofoil profile itself may be within tolerance with regard to both thickness and shape; its position in space, however, with respect to some datum such as, for example, the blade root may be outside tolerance. Such positional errors of the whole aerofoil may be compensated for by what are known as stacking tolerances. The whole actual and reference aerofoils may be moved relative to each other to achieve a best-fit condition between the two profiles. The shift required to achieve that best-fit is the stacking. Whether or not the component is then within tolerance will depend upon the actual dimensional stacking shift made relative to the stacking tolerance allowable on the specific component. Such stacking shifts may comprise in the plane of the aerofoil two linear shifts in mutually perpendicular directions plus rotation. Stacking is, therefore, applied in an attempt to bring the actual component surface within both the dimensional or thickness and shape tolerances referred to above. The operator of an OMT-type machine may, therefore, adjust the position of the reference aerofoil within an allowable stacking tolerance to achieve a "best-fit". Thus, the degree of metal-on and metal-off conditions may be adjusted such that a minimum of metal from a metal-on position, ideally on the low pressure surface, has to be removed to bring the whole aerofoil section within the required tolerances. The method still thus necessitates a high level of operator skill in that he needs to follow the graticule image at all times and must assess the degree of stacking required by a manual iterative process prior to any actual machining being undertaken on the component, usually by another operator. After machining, the component again needs to be checked.

Clearly, where mechanical comparator gauges are employed and both component and reference blank are in fixed orientation and position there is no scope whatever for any stacking operation to be carried out by the operator.

In the case of optical measuring machines the term "best-fit" used above is not an absolute description but a relative term only. Where the operator has to manually adjust the relative positions of the component and desired aerofoils he can only apply, in effect, simplified visual criteria to the operation and thus the applied visual "best-fit" will only be the result of the projector operator's judgement. Such judgement may vary from operator to operator and also from day to day in the same operator. The existing methods of applying stacking shifts have necessarily been simple as heretofore the facilities to compute the optimum stacking in a machine have been unavailable.

It is an object of the present invention to provide means for the gauging of aerofoils which do not rely on expensive, dedicated, multi-point probes. It is a further object to provide means for such gauging which are less labour-intensive and require less operator skill than optical measuring machines and mechanical comparator gauges.

It is a yet further object of the present invention to provide, in addition to the gauging means stated above, means for the automatic rectification by machining of components.

According to a first aspect of the present invention, there is provided a method for the automatic measurement of a turbine component having an airfoil, the method comprising the steps of:

producing relative motion by electric drive motors between the turbine component and contacting probe means in two mutually perpendicular axes;
continuously scanning a chordal section of said airfoil with said probe means;
generating signals corresponding to airfoil section profile dimensions and orientation by transducer means associated with the drive to the component and by encoder means associated with the drive to the contacting probes;
comparing by computer means the generated signals with data stored in computer memory means, said stored data relating to a reference airfoil section profile;
calculating any dimensional errors between the component airfoil profile and the reference airfoil profile by computer means; and
mathematically analysing the calculated dimensional errors by means of a computer program to establish stacking values which will yield a minimum value for the sum of the root mean square values of said dimensional errors so as to maximize coincidence between the component airfoil profile and the reference airfoil profile.

According to a second aspect of the present invention there is provided apparatus for the automatic measurement of a turbine component having an airfoil, the apparatus comprising:

a clamp for holding the component to be measured;
contacting probes for continuously scanning a chordal section of the component airfoil;
first and second electric motor drive means connected to the clamp and to the probes respectively to produce relative motion between the component and the probes in two mutually perpendicular directions;
a first transducer to generate signals representative of component displacement in one of said two mutually perpendicular directions;
an encoder to generate signals representative of probe displacement in the second of said two mutually perpendicular directions;
computer data acquisition means to receive the signals generated by said first transducer and said encoder, said signals relating to dimensions of the component airfoil profile;
computer memory means for storing data relating to a reference airfoil profile;
computer data processing means for calculating dimensional errors between the component airfoil profile and the reference airfoil profile and mathematically analysing the calculated dimensional errors to establish stacking values which yield a minimum value for the sum of the root mean square values of said dimensional errors so as to maximize coincidence between the component airfoil profile and the reference airfoil profile.

In a preferred embodiment, there is further included third electric motor drive means to produce relative motion between the component and the probes in a third direction which is mutually perpendicular to the first and second mutually perpendicular directions, and a second transducer to generate signals representative of displacement in the third direction.

Preferably, the apparatus further comprises means for producing a record of the stacking and results such as, for example, a printer, plotter or visual display unit (VDU) linked to the computer means.

In one embodiment of the present invention, the probe means may be contacting probes. The component may, for example, be mounted on a fixture, the fixture being movable in one direction (X-axis) and the component, for example, a turbine blade, may be mounted with its principal axis generally perpendicular to the X-axis. The probes may be movable in two mutually perpendicular directions, the Y and Z-axes, and where the Y-axis is substantially parallel to the blade principal axis. The probe driving motor in the Z-axis may be of the low-torque overdriving type.

By means of a computer program, the probes may be driven in a predetermined sequence to track chordal sections of the aerofoil. The transducer means on the various direction axes measure the dimensions of the aerofoil and compare the measurements obtained with those stored in the memory means and which relate to the dimensions which it is desired to achieve. The data thus acquired is processed—firstly to establish deviation between the actual and desired profile, and secondly stacked to establish an acceptable or a best-fit condition between actual and desired. The latter processing yields the shifts required to achieve best-fit as well as the resultant profile error.

The information relating to the errors between the desired and actual profiles are analysed mathematically by the computer means to establish stacking values which will yield a minimum value for the sum of root mean square values of the variations in metal-on condition. Where the shifts in the X and Z-axes dictated by the resulting analysis are insufficient to bring all points of the actual aerofoil profile within the tolerance envelope of the desired aerofoil profile the actual aerofoil may then be stacked iteratively. This process is automatically carried out by the computer means in order to attempt to bring the actual aerofoil within tolerance without having to scrap or rectify the component. Such iterative stacks, however, may only yield a marginal improvement on the analytical stack.

In one embodiment of apparatus of the present invention the clamp means for holding the component is magnetically coded such that on being attached to the apparatus the appropriate software in the computer memory means is automatically down-loaded for gauging the intended component.

In a preferred embodiment of the apparatus where turbine components such as, for example, blades, may be clamped by unmachined features such as roots, the probes may first search for and establish the position in space of critical reference features of the component such as leading and trailing edges, for example. The ability of the apparatus to do this means that it no longer becomes dependent on highly accurate machined features on the component in order to place it in a fixed reference position in space. The apparatus is programmed to search for the component within a relatively wide but well-defined reference envelope and once having located a surface of the component, the driven probes measure the actual position of the component surfaces by continuous, local scanning. This data is then used to redatum the apparatus axes in such a way as to put the critical reference features in the expected position. Where one or more of the component surfaces is found to lie outside the defined reference envelope, the computer means arrests the gauging cycle and illuminates appropriate signals on the apparatus. The operator then checks to see if, for example, the correct clamping means or the correct component has been installed, or that the component has been correctly loaded.

When gauging a component such as a blade, for example, the apparatus computer means may be computer program means gauge two reference aerofoil chordal sections, usually those near the root and tip of the component. The necessary stacking may then be computed and as a result the computer means may then redefine the apparatus axes to compensate for the stacking applied. This allows the aerofoil part of the component to be gauged independently in its entirety without reference to unmachined component root and tip blocks. Thus the accuracy or otherwise of the airfoil may be verified independently and the data acquired for the redefined apparatus axes may subsequently be used to aid in the machining of the root and tip blocks to ensure that the aerofoil is correctly orientated when assembled in a turbine disc, for example.

The motor drive to the probes in the Z-axis may be by a low-torque overdriving motor and to avoid unnecessary stress on the component and probe tips the machine is programmed such that the probes always scan the aerofoil section in a falling mode.

In an alternative embodiment, non-contacting probes may be used, these being especially advantageous for gauging of, for example, delicate ceramic-type cores used for forming the internal passages during casting of turbine components.

All that is necessary for the operator to do is to load and unload the components from the machine, and even this operation may be automated by known techniques.

The results may be presented in graphical, tabular, diagrammatic or electronic form and coded data may be put directly on to the gauged components themselves by means of, for example, ink spray, pen, magnetic means or similar marking system. The coded data may be in the form of colours, for example, applied to the component surface, each colour representing a specific amount of metal to be removed on the area on which the colour lies. Batches of marked components may, therefore, be taken for machining and subsequently re-gauged and re-marked, if necessary.

Results presented in electronic form are particularly applicable to intercommunication with other numerically-controlled apparatus such as, for example, robot handling equipment.

According to a third aspect of the present invention, apparatus for the automatic gauging and machining of engineering components comprises gauging means, handling means and machining means, the gauging means having:

means for holding a component to be gauged;

probe means for scanning a surface of the component;

drive means to provide relative motion between the component and the probe means in three mutually perpendicular axes;

measuring transducer means associated with the drive means and the probe means to generate signals to measure the degree of relative movement between the component and the probe;

computer memory means for storing data relating to a reference profile having dimensions which it is desired to achieve;

means for comparing signals generated by the measuring transducer means with the corresponding signals in the memory means;

means for computing the error between the stored data and the signals generated by the measuring transducer means to stack the component to achieve an acceptable degree of coincidence between the reference profile and the actual component;

handling means for transferring the component from the gauging means to the machining means and back to the gauging means;

computer means for communicating data relating to any residual error from the gauging means to the machining means, and means associated with the machining means or with the handling means for controlling the degree of machining in accordance with the data communicated from the gauging means.

In a preferred embodiment of the present invention the apparatus further comprises an automatic component loading and unloading facility for the gauging means such that the apparatus may process batches of components substantially without intervention of an operator.

In one embodiment of the invention the handling device may comprise a known, but suitably modified robot, which may place the component firstly into clamping means associated with the gauging means and then secondly, into clamping and manipulating means associated with the machining means, and then back in the gauging means for re-gauging after machining.

Preferably, the machining means may be abrasive belt machining wherein the degree and rate of machining may be time and pressure controlled. Alternatively, the machining means may, for example, comprise abrasive grit blasting or resilient grinding wheels.

According to a further aspect of the present invention, a method for the automatic gauging and machining of engineering components includes the steps of:

producing relative movement between the component and probe means in three mutually perpendicular axes;

scanning the component surface with the probe means by means of a computer program controlling the relative movement;

generating signals relating to component dimensions and geometry by transducer means associated with the relative movement between the component and the probe means;

comparing by computer means the generated signals with data stored in computer memory means and which relates to a reference profile which it is desired to achieve;

calculating the error by computer means between the generated signals and the stored data;

stacking the measured component data by computer means to achieve an acceptable degree of coincidence between the reference profile and the actual component profile;

moving the component by the handling device to machining means;

communicating data relating to any residual dimensional error from the gauging means to the machining means, and machining the component in accordance with the data relating to the residual dimensional error.

Preferably, the component is returned to the gauging means after machining in order to confirm that an appropriate amount of material has been removed. Preferably, the process and apparatus may have facilities whereby components which meet all dimensional and shape criteria are automatically unloaded from the gauging means without being transferred or moved to the machining means. Similarly, those components whose dimensions are incapable of being rectified, may also be unloaded from the gauging means and scrapped without passing to the machining means.

In accordance with known computer techniques the computer means may be programmed for self-optimisation. Initially the computer means controlling the machining means may be programmed with conservative data to ensure that too much material is not removed.

Thus in order to rectify a component several cycles between the gauging means and machining means may be required. By computing factors relating to, for example, the state of wear of the abrasive belt, the type of material of the component, the degree of metal-on, etc. the number of cycles may eventually be minimised. Appropriate safeguards must always, however, be employed to prevent excess material removal.

Maximum benefit may be obtained from the invention if the loading and unloading operations for the gauging means are carried out automatically by robotics. This may be achieved as a subsidiary function of the aforementioned handling device.

Since the machining operation is an intrinsically longer operation than the gauging operation, it may be feasible to have one gauging apparatus feeding more than one machining station.

In order that the present invention may be more fully understood, examples will now be described by way of illustration only, with reference to the accompanying drawings of which:

FIG. 1 shows a schematic side elevation of gauging apparatus according to the invention;

FIG. 2 shows a detail in plan view of the probe/component arrangement of FIG. 1;

Figure 7:
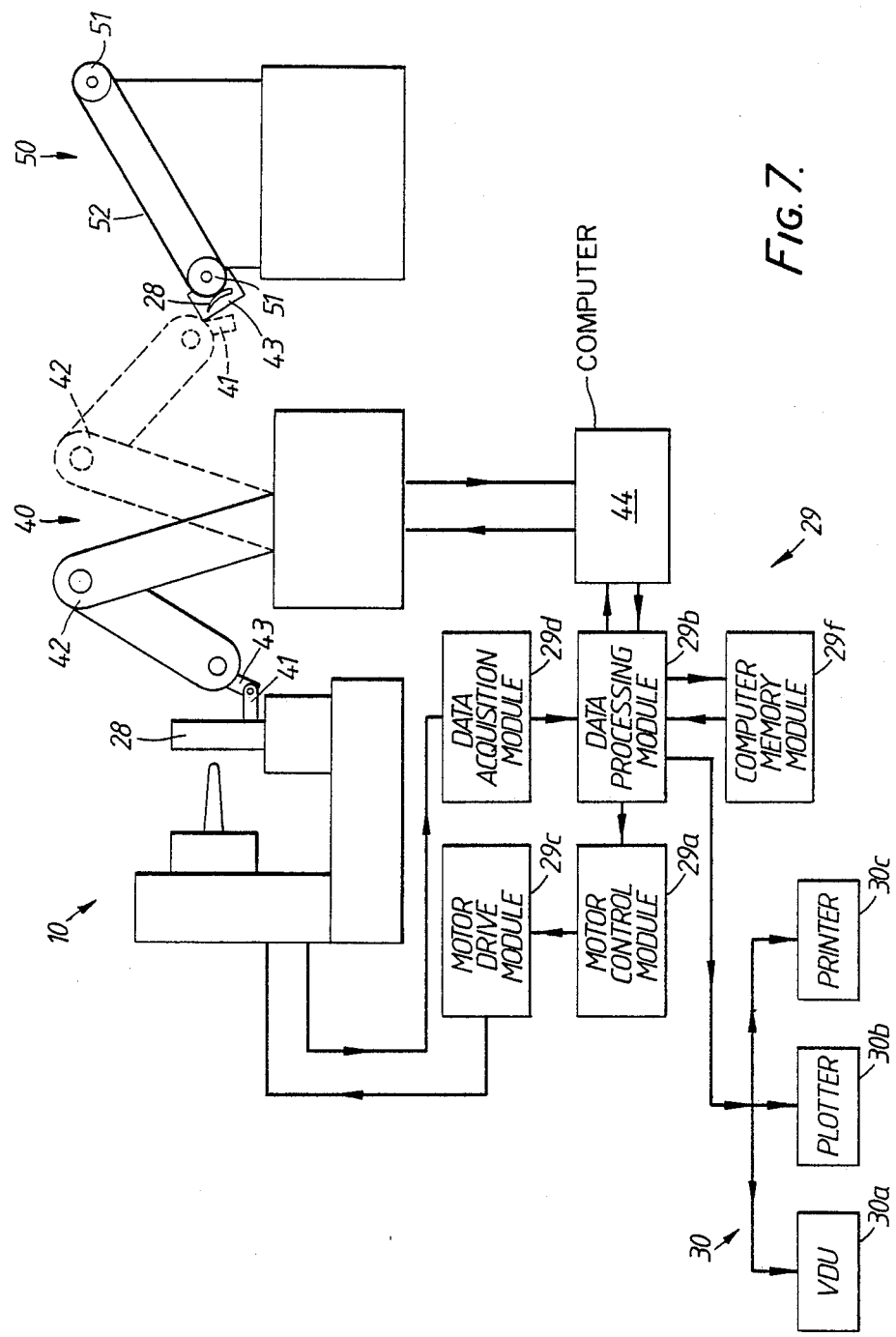

FIGS. 4(a), (b) and (c) show reproductions of actual print-outs of the scanning and stacking results of scans around the aerofoil profile at three axial positions for a blade having passed inspection;

FIGS. 5(a), (b) and (c) are similar to FIGS. 4, but shows a failed blade incapable of being rectified by machining;

FIGS. 6(a), (b) and (c) are similar to FIG. 4, but show an out-of-tolerance blade in the metal-on condition suitable for rectification by machining;

FIG. 7 shows a schematic representation of the gauging apparatus of FIG. 1 linked to metal removal means by a handling device for the automatic machining of components.

Referring now to FIGS. 1 and 2 and where the same features are denoted by common reference numerals.

The gauging apparatus is shown generally at 10. The apparatus comprises a rigid frame having a horizontal frame member 11 and a vertical frame member 12. Mounted on the members 11 and 12 are machine slides 13 and 14, respectively, the slides 13 and 14 are driven relative to the members 11 and 12 by positioning motors 15 and 16 via couplings and lead-screws (not shown) in the X-axis and Y-axis, respectively. Movement of the slides 13 and 14 is measured by transducers 17 and 18, respectively. On the slide 14 is mounted a cross-slide 19 which moves in the Z-axis. The slide 19 is driven by a low-torque overdriving motor 20 via a rack and pinion gear assembly 21. Driven from the slide 19, also by a rack and pinion gear assembly 22, is an encoder 23. The encoder 23 generates positional signals relating to probes 24 and 25 which are mounted on a carrying frame 26 which is itself mounted on the slide 19. Mounted on the slide 13 is a mounting clamp 27 for holding the component 28, in this instance a gas turbine engine blade, which is to be gauged. A computer 29, programmed for both control 29a and data processing 29b functions is linked to the apparatus 10 via motor drive electronics 29c and data acquisition electronics 29d. The drive electronics 29c is connected to the motors 15, 16 and 20. The data acqustion electronics picks up signals from transducers 17 and 18, the encoder 23 and other sensors not shown. The drive electronics 29c and data acquisition electronics 29d include analogue/-digital converters as necessary to make the data amenable to computer processing. The signals transmitted via the drive electronics are generated in accordance with software relevant to the component being gauged stored in computer memory 29f and signals fed back from the transducers 17 and 18 and encoder 23. Linked to outputs from computer 29 is a VDU 30a indicating directly the results of gauging, a plotter 30b for giving hard copy results in graphical form and a printer 30c for giving more detailed results in tabular form. The printout from plotter 30b is in the form of geometric representations of the aerofoil profile 31, together with dimensional and stacking data relating to those profiles (see FIGS. 4, 5 and 6). The apparatus is also, of course, fitted with various control switches, actuators and sensors (not shown) for initiating and stopping the apparatus.

Figure 3:
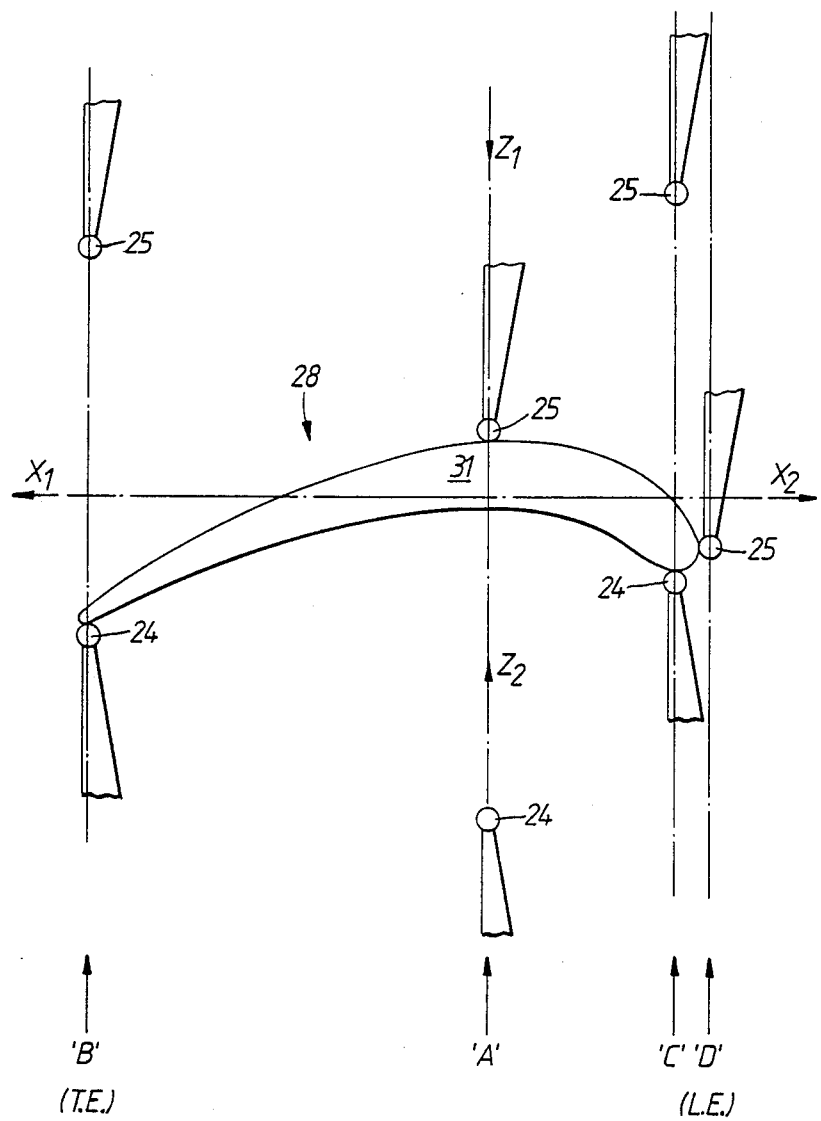
FIG. 3 shows the scanning mode of the probes of FIGS. 1 and 2 on a typical blade aerofoil.

In operation, and now also referring to FIG. 3, the blade 28 is loaded into the mounting clamp 27 with the major axis of the blade generally parallel to the Y-axis. The gauging sequence is initiated by pressing an appropriate switch. The program stored in the computer memory 29f starts the motor 16 via the control function 29a and motor drive electronics 29c and drives the slide 14 until the probes 24 and 25 are in the correct Y-co-ordinate position, as related to the computer by transducer 18, to begin scanning the desired section of the blade 28. The motor 15 then drives the blade 28 towards and between the probes 24 and 25 where the component is arrested at position 'A', the "highest" point on the blade profile convex surface. The motor 20 via the slide 19 moves the probe 25 towards the blade 28 (since the probes 24 and 25 are in a fixed relationship to each other, probe 24 moves away from the blade). On contacting the blade, the probe 25 stops due to the motor 20 being stalled, and the motor 15 then drives the blade in the $X_1$ direction, the probe 25 remains in contact with and in a falling mode with respect to the blade, driven by the motor 20, until it reaches position 'D' where the probe 25 accelerates rapidly in the $Z_1$ direction. The probe 25 and slide 13 are halted by the computer which recognises, due to the program, that the probe 25 has exceeded the dimensions of an envelope in which the aerofoil must lie. Probe 25 is then retracted to allow the blade profile 31 to move in the $X_2$ direction to position 'C' relative to the probe axis. Probe 24 is then moved towards the blade 28 in the position 'C'. On reaching the blade, the probe 24 stops and the blade is then moved in the $X_2$ direction and all the time the probe 24 is driven against the blade, again in a falling mode, until position 'A' is reached, the "lowest" point of the blade undercambered surface. On reaching 'A' the X-traverse is halted and probe 25 is moved towards the blade. On contacting the blade, the X-traverse, again in the $X_2$ direction is continued until the probe 25 reaches the trailing edge just to the left of position 'B' where again the probe 25 rapidly accelerates in the $Z_1$ direction and is halted and retracted under command of the computer program. The same process of continuously scanning the blade profile 31 in a number of subscans, always with the probes 24 or 25 in a falling mode, continues until the complete profile 31 has been gauged. This applies also to the relatively short regions scanned by probe 24 to the left of position 'B' in the $X_2$ direction and to the right of position 'C' in the $X_1$ direction. All the while, the relative movements between the blade 28 and the probes 24 and 25 are controlled by the program in the computer 29. Simultaneously, the transducers 17 and 18 and encoder 23 are supplying positional signals relating to the blade profile 31 dimensions to the computer 29 where these results are compared with the required profile and tolerances stored in the computer's memory. The computer then analyses the results obtained and calculates the required shifts in the X and Z axes and any rotational stacking necessary to maximise the degree of coincidence between the actual profile 31 and the required profile stored in the computer 29 memory. Where the achievement of maximum coincidence between actual and desired profiles results in exceeding the stacking tolerance the computer re-analyses the data to achieve an acceptable degree of coincidence which is within tolerance of the actual and desired profiles and which is also within the allowable stacking tolerance if this is possible. The calculations thus made are then produced as geometric representations of the profile 31 by the printer 30. The motor 16 then positions the probes 24 and 25 at the appropriate Y-co-ordinate for the next blade section to be scanned, and the above process is repeated. Three sections on the blade 28 are scanned and profiles 31 are produced by the plotter 30b in the form shown in FIGS. 4(a), (b) and (c), 5(a), (b) and (c), and 6(a), (b) and (c), the FIGS. 4, 5 and 6 having been copied from actual print-outs from plotter 30b.

It should be noted that although the blade profile 31 shown in FIG. 3 shows the "highest" point on the convex surface and "lowest" point on the undercambered surface coincident at position 'A' for simplicity of description this situation rarely pertains in practice. The computer program is such that the positions of the "highest" and "lowest" points of the profile are computed from acquired data in every case. Thus the description relating to FIG. 3 is a particular case where these two points do coincide and is used for simplicity.

Figure 5:
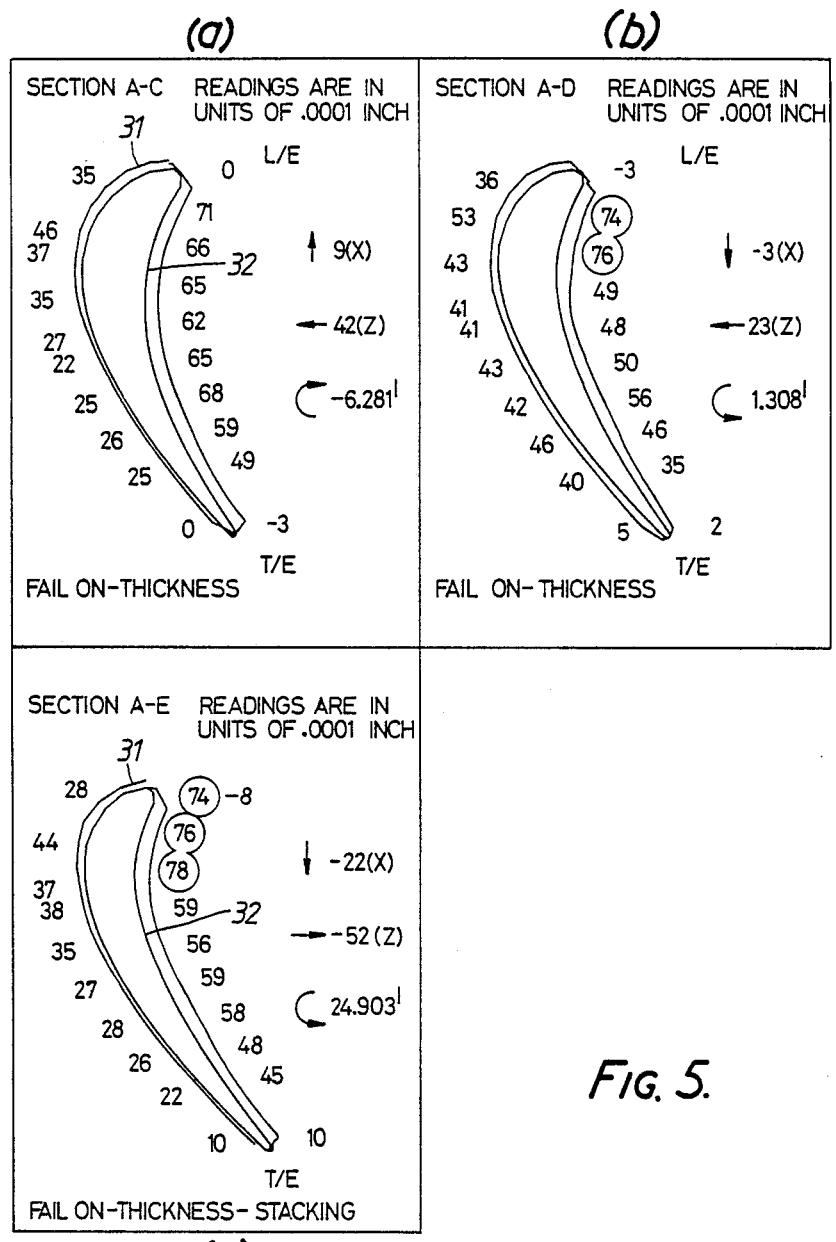

Referring now to FIGS. 4, 5 and 6, FIG. 4 shows that all three sections of the blade scanned have passed and, therefore, that blade has met the customer's inspection requirements. In FIG. 4(b), for example, the stacking shifts required to produce maximum coincidence between the actual profile 31 and the required profile 32 was +0.0005" in the X direction, +0.0018" in the Z direction and an anticlockwise rotation of 1.844'. The aerofoil by these stacking shifts, which are themselves within tolerance, has been rendered completely within tolerance and requires no rectification. FIGS. 5(a), (b) and (c) depict the profiles obtained on a blade of the same type as that of FIG. 4 but which has failed completely as a result of being under-size. It may be seen in (a) and (b) that the sections have failed as a result of being under-size, (a) at the trailing edge, (b) and (c) at the leading edge. The stacking has been optimised to minimise the out-of-tolerance feature, but it is not possible under any stacking circumstances to render the actual profile 31 within tolerance with respect to the desired profile 32. The section shown at FIG. 5(c) has been rejected both for being out-of-tolerance on dimensions at the leading edge and also for being outside the stacking tolerance. It can be seen from the data presented in the print-out shown in FIG. 5(c) that in order to achieve a best-fit of the actual profile 31 with that of the desired profile 32, the stacking tolerance has been exceeded in that an anti-clockwise rotation of 24.903' was required to achieve a best-fit. In the actual print-out from plotter 30b this stacking figure is printed in red.

FIG. 6 shows a set of blade aerofoil scans where they have again failed on thickness. However, this failure is because of a metal-on condition which can be rectified by machining. Although not apparent from FIGS. 4, 5 and 6 the colours used to print the dimensions vary according to the metal condition. Thus, where the dimensions are within tolerance these are printed in green, metal-off or other unrectifiable tolerance failures are in red with negative sign where appropriate and metal-on is in blue. In FIGS. 6(a), (b) and (c) those figures ringed are metal-on and may be rectified by machining. It may be seen that the computer is programmed to stack the data such that most material which needs to be removed is on the more easily accessible convex or low pressure face of the aerofoil.

Referring now to FIG. 7. Gauging apparatus is shown generally at 10 with a blade 28 held in the apparatus 10. Linked to the apparatus 10 is a computer 29 which is split up into the various functions as described with reference to FIG. 1 and which supplies control signals to the apparatus 10 and receives signals relating to the component dimensions and geometry from the apparatus 10. Sited close to the apparatus 10 is a robot shown generally at 40 and which comprises a gripper 41 adapted to hold the blade 28, the gripper being at the end of a jointed manipulating arm 42. Also situated between the end of the manipulating arm 42 and the gripper 41 is a pressure sensing device 43 with the transducers to provide signals for control purposes. Operation of the robot 40 is effected by computer 44 which provides control signals to the manipulating arm 42 and receives information signals from the pressure sensing device 43. Computers 29 and 44 are linked to communicate with each other. Sited close to the robot 40 is an abrasive belt machining device 50 having drive wheels 51 around which an abrasive belt 52 passes.

In operation, the gauging apparatus 10 functions as described above with reference to FIGS. 1 to 3. The necessary data is computed by the computer and is communicated from the computer 29 to the computer 44 which controls the operation of the robot 40, which removes the blade 28 from the gauging apparatus and transfers it to the belt finishing machine 50 by means of the gripper 41 and manipulating arm 42 (both shown as dotted lines). Metal is removed by presenting the appropriate areas of the blade to the abrasive belt 52. The rate and amount of metal removed is controlled by the pressure and time of abrasion, the pressure being measured by the sensor 43 and controlled by the computer 44. Where metal has to be removed from adjacent areas on an aerofoil, the rates of pressure increase and decrease are 'ramped' to provide smoothly blended contours. When sufficient metal in accordance with signals supplied from computer 29 to computer 44 has been removed, the robot 40 transfers the blade 28 back to the gauging apparatus 10 for re-gauging. If, on re-gauging, the blade is still found to be outside tolerance with a metal-on condition, it is transferred back to the abrasive belt finisher 50 for further processing as before. If, however, the blade is now found to be within tolerance, it is removed from the machine and a new blade is loaded for gauging.

Further refinements to the described apparatus may be made. For example, automated loading and unloading of the gauging apparatus may be included, either by dedicated loader/unloader apparatus which is also controlled by computer and actuated by the gauging apparatus declaring a component to be within tolerance or a total reject and thus initiating the loading/unloading apparatus to remove the component to an appropriate store and load a new component for gauging. Alternatively, the robot 40 may be further programmed to load and unload the gauging apparatus 10, in addition to transferring the component between gauging apparatus 10 and abrasive belt machine 50. Pressure sensors may be associated with the machining means rather than with the handling robot 40.

In an alternative embodiment the robot 40 may merely transfer the component between the gauging means and the machining means. The machining means may have a dedicated manipulating device associated with it for manipulating the component. In such an embodiment computer means would also be linked to the machining means manipulating device.

It will be appreciated that the present invention is not limited in scope to the examples given and that it is equally applicable to the gauging and rectification of many engineering components having complex curved surfaces, especially where such components are relatively thin and flexible and not amenable to machining by conventional metal cutting methods such as milling and turning.

I claim:

1. A method for the automatic measurement of a turbine component having an airfoil, the method comprising the steps of:
   producing relative motion by electric drive motors between the turbine component and contacting probe means in two mutually perpendicular axes;
   continuously scanning a chordal section of said airfoil with said probe means;
   generating signals corresponding to airfoil section profile dimensions and orientation by transducer means associated with the drive to the component and by encoder means associated with the drive to the contacting probes;
   comparing by computer means the generated signals with data stored in computer memory means, said stored data relating to a reference airfoil section profile;
   calculating any dimensional errors between the component airfoil profile and the reference airfoil profile by computer means; and
   mathematically analysing the calculated dimensional errors by means of a computer program to establish stacking values which will yield a minimum value for the sum of the root mean square values of said dimensional errors so as to maximize coincidence between the component airfoil profile and the reference airfoil profile.

2. A method according to claim 1 further including the step of iteratively stacking the component airfoil profile when the mathematical stack fails to bring said airfoil into coincidence with the desired profile within a desired tolerance.

3. Apparatus for the automatic measurement of a turbine component having an airfoil, the apparatus comprising:
   a clamp for holding the component to be measured;
   contacting probes for continuously scanning a chordal section of the component airfoil;
   first and second electric motor drive means connected to the clamp and to the probes respectively to produce relative motion between the component and the probes in two mutually perpendicular directions;
   a first transducer to generate signals representative of component displacement in one of said two mutually perpendicular directions;
   an encoder to generate signals representative of probe displacement in the second of said two mutually perpendicular directions;
   computer data acquistion means to receive the signals generated by said first transducer and said encoder, said signals relating to dimensions of the component airfoil profile;

computer memory means for storing data relating to a reference airfoil profile;

computer data processing means for calculating dimensional errors between the component airfoil profile and the reference airfoil profile and mathematically analysing the calculated dimensional errors to establish stacking values which yield a minimum value for the sum of the root mean square values of said dimensional errors so as to maximize coincidence between the component airfoil profile and the reference airfoil profile.

4. Apparatus according to claim 3 and further including third electric motor drive means to produce relative motion between said component and said probes in a third direction which is mutually perpendicular to said first and second mutually perpendicular directions, and a second transducer to generate signals representative of displacement in said third direction.

5. Apparatus according to claim 3 wherein said clamp is magnetically coded such that on being installed in said apparatus computer software appropriate to the component being measured is down loaded into said computer memory means.

* * * * *